Patented June 9, 1931

1,809,234

UNITED STATES PATENT OFFICE

HANS T. CLARKE, OF ROCHESTER, NEW YORK, ASSIGNOR TO EASTMAN KODAK COMPANY, OF ROCHESTER, NEW YORK, A CORPORATION OF NEW YORK

CELLULOSE ESTER COMPOSITION

No Drawing.  Application filed February 9, 1929.  Serial No. 338,889.

This invention relates to a new composition of matter in which cellulose esters are combined or mixed with other substances in order that the resulting product may be advantageously used in the plastic and analogous arts such as lacquer, varnish, sheet, or film manufacture.

Cellulose esters alone are not suitable for many of the above described applications. It is customary to combine these esters with various other compounds to enhance the flexibility of the resulting product. For instance, the esters are combined with the so-called "low-boiling," "medium boiling," and "high boiling," organic compounds which impart to these esters useful and valuable commercial qualities. Particularly in the photographic art it is essential that films produced from cellulose esters be transparent, strong, and flexible and may be formed in the desired thinness. It is also necessary that the solution of the ester be easily fluid in order that it may be readily flowed on suitable film forming surfaces.

The object of the present invention is to provide cellulose ester compositions having the hereinabove described characteristics.

I have found that when cellulose esters are incorporated with condensation products of chloral and amides the resulting materials have many unexpected qualities. The cellulose acetate containing this condensation product burns in air with great difficulty. The propagation of combustion of the composition is retarded to such an extent that films when ignited often go out and must be re-ignited several times during the test. The films also are exceptionally transparent and flexible.

The condensation products which have been above referred to are described in "Leibig's Annalen" by Jacobsen, volume 157, page 243, 1871. I have found that the products particularly suitable for my purposes are the two compounds of chloral with urea: $CCL_3CHO.CON_2H_4$ and $(CCL_3CHO)_2CON_2H_4$ respectively and the compound of chloral with an acetamide: $CCL_3CHO.CH_3CONH_2$. The discovery, however, is not confined to the exact compounds here mentioned, for good results may be obtained from mixtures or any of them in any proportion.

It is, moreover, not necessary to prepare the double compounds before incorporating them into the cellulose esters. It is merely sufficient to incorporate simultaneously chloral, (or its hydrate) together with the desired amid in suitable proportions. The condensation results by mere mixing of the one with the other, even in the presence of the cellulose ester.

The chloral or chloral hydrate may be used in conjunction with ureas, carboxylic amides such as formamide, acetamid, etc., or the alkyl urethanes, such, for example, as methyl, ethyl, propyl and butyl carbamate. These substances combine with the cellulose esters to form the especially desirable compositions hereinabove described. It is important to note that true compound formation between the chloral and the amides takes place when the components are mixed together and that we are dealing with a type of substance which is different from any of the components. The group of ureas, carboxylic amides and alkyl urethanes will hereinafter be referred to as alkyl, alkoxy, and amino substituted carboxylic amides.

Cellulose ester films containing these double compounds have characteristics quite different from similar films to which chloral hydrate alone has been added, one of the more marked characteristics being that the inflammability of the ester containing the double compound is much more powerfully suppressed than in the case of the ester having the chloral hydrate alone.

Several examples will be here given to more clearly bring out the method of forming these compositions.

*Example 1.*—Ten parts of cellulose acetate and one part of a compound containing 2 molecular proportions of chloral and one molecular proportion of urea is dissolved in 40 parts of acetone.

*Example 2.*—Twenty parts of cellulose acetate and two parts of chloral hydrate and one part of urea are dissolved in 80 parts of acetone.

*Example 3.*—Forty parts of cellulose acetate, 3 parts of chloral hydrate and 3 parts of N-butyl carbamate is dissolved in 160 parts of acetone.

*Example 4.*—Forty parts of cellulose nitrate, 3 parts of urea, and 4 parts of chloral hydrate and 15 parts of monochlornaphthalene are dissolved in 160 parts of acetone.

It will be understood as stated above that these cellulose ester compositions may also contain ingredients which, as well as increasing the flowability of the resulting dope, also enhance the plasticity of the final product. Such, for example, are monochlor-naphthalene, tricresyl phosphate and cresyl para toluene sulphonate. When more flowable solutions are desired, or when compositions are to be employed as lacquers, the volatile solvents may be increased as will be understood by those skilled in the arts, or volatile nonsolvents such as benzol, alcohol, and the like may be added but not to a point where precipitation results. Along with the ingredients given with the above examples, I may add one or more organic bodies of only slight volatility for regulating the smooth film flowing qualities of the composition. Examples of them are amyl or butyl alcohols, the various amyl alcohols, the various butyl alcohols and mixtures of them.

Various modifications in the proportions and equivalents given may be made without departing in any measure from the invention, or sacrificing any of the advantages derived therefrom.

Having thus described my invention, what I claim as new and desire to secure by Letters Patent is:

1. A composition of matter comprising a cellulose ester and a compound formed between chloral and a material selected from the group including an alkyl, alkoxy, and amino substituted carboxylic amides.

2. A composition of matter comprising a cellulose ester and a compound formed between chloral and a material selected from the group including an alkyl, alkoxy, and amino substituted carboxylic amides and a common solvent.

3. A composition of matter comprising a cellulose ester and a compound formed between chloral and a material selected from the group including an alkyl, alkoxy, and amino substituted carboxylic amids, and a substance which enhances the flexibility thereof.

4. A composition of matter comprising a cellulose ester and a compound formed between chloral and a material selected from the group including an alkyl, alkoxy, and amino substituted carboxlic amids, and cresyl paratoluene sulphonate.

5. A composition of matter comprising a cellulose acetate and a compound formed between chloral and a material selected from the group including an alkyl, alkoxy, and amino substituted carboxylic amides.

6. A composition of matter comprising a cellulose acetate and a compound formed between chloral and a material selected from the group including an alkyl, alkoxy, and amino substituted carboxylic amides and a common solvent.

7. A composition of matter comprising a cellulose acetate and a compound formed between chloral and a material selected from the group including an alkyl, alkoxy, and amino substituted carboxylic amides and a substance which enhances the flexibility thereof.

8. A composition of matter comprising a cellulose acetate and a compound formed between chloral and a material selected from the group including an alkyl, alkoxy, and amino substituted carboxylic amides and cresyl paratoluene sulphonate.

9. A composition of matter comprising a cellulose nitrate and a compound formed between chloral and a material selected from the group including an alkyl, alkoxy, and amino substituted carboxylic amides.

10. A composition of matter comprising a cellulose nitrate and a compound formed between chloral and a material selected from the group including an alkyl, alkoxy, and amino substituted carboxylic amides and a common solvent.

11. A composition of matter comprising a cellulose nitrate and a compound formed between chloral and a material selected from the group including an alkyl, alkoxy, and amino substituted carboxylic amides and a substance which enhances the flexibility thereof.

12. A composition of matter comprising a cellulose nitrate and a compound formed between chloral and a material selected from the group including an alkyl, alkoxy, and amino substituted carboxylic amides and cresyl paratoluene sulphonate.

13. As an article of manufacture, a sheet of deposited or flowed cellulose ester containing a compound formed between chloral and a material selected from the group including an alkyl, alkoxy, and amino substituted carboxylic amides.

14. As an article of manufacture, a sheet of deposited or flowed cellulose ester containing a compound formed between chloral and a material selected from the group including an alkyl, alkoxy, and amino substituted carboxylic amides and a substance which enhances the flexibility thereof.

15. As an article of manufacture, a sheet of deposited or flowed cellulose acetate containing a compound formed between chloral and a material selected from the group including an alkyl, alkoxy, and amino substituted carboxylic amides.

16. As an article of manufacture, a sheet of deposited or flowed cellulose nitrate containing a compound formed between chloral and a material selected from the group including an alkyl, alkoxy, and amino substituted carboxylic amides.

17. A composition of matter comprising cellulose acetate and a compound formed between chloral and urea.

Signed at Rochester, New York, this 5th day of February, 1929.

HANS T. CLARKE.